A. S. Nijnnes,
Grinding Saws.
Nº 15,773. Patented Sep. 23, 1856.

UNITED STATES PATENT OFFICE.

A. S. NIPPES, OF LOWER MERRION, PENNSYLVANIA.

MACHINE FOR GRINDING SAWS.

Specification of Letters Patent No. 15,773, dated September 23, 1856.

*To all whom it may concern:*

Be it known that I, ALBERT S. NIPPES, of Lower Merrion, in the county of Montgomery and State of Pennsylvania, have invented certain new and useful Improvements in Machines for Grinding Saws; and I do hereby declare the following to be a full, clear, and exact description of the construction and operation of the same, reference being had to the accompanying drawings, making a part thereof, in which—

Figure 1:
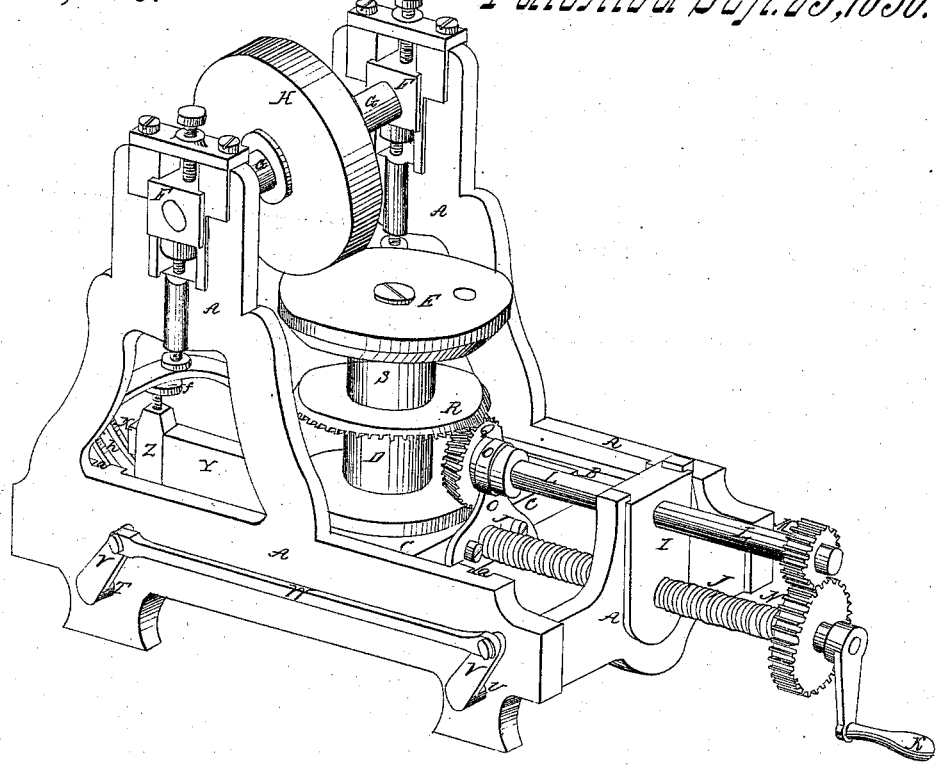
Figure 2:
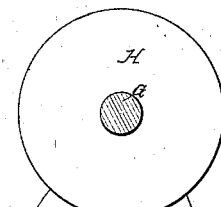
Figure 3:
Figure 3:
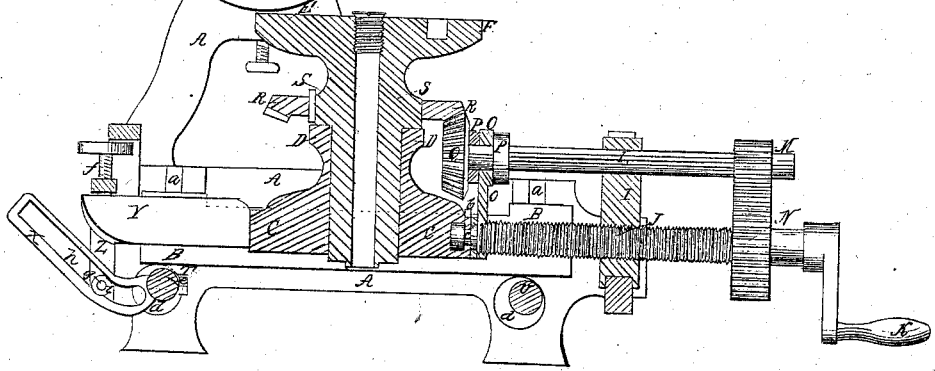

Figure 1 represents a perspective view, Fig. 2 represents a vertical longitudinal section through the same, and Fig. 3 represents a section through a circular saw of peculiar form, for illustration of the principle of the machine.

Where similar letters of the alphabet are used in the separate figures, they denote like parts of the machine in both.

The nature of my invention relates to the grinding of saws to pattern, and compensating for the wear of the stone by causing the stone and face plate to approach or recede from each other by a regulated movement which gives the exact shape desired to the saw plate.

To enable others sgilled in the art to make and use my invention, I will proceed to describe the same with reference to the drawings.

A substantial metallic frame A, is provided with ways B, upon which are tongues that fit into the vertical grooves $a$, $a$, so that said ways may have a rising and falling motion, as will be hereafter described. On these ways B is placed a carriage C, from which rises a pillow block D, which supports a face plate E, in such manner as to have a rotary motion communicated to it while it traverses with the carriage. Upon this face plate E, the saw plate that is to be ground is permanently secured and held. In adjustable boxes F, in the upright portions of the frame A, is hung the shaft G, which carries the stone or grinding wheel H, and a rotating motion can be given to this shaft and stone by any well known means.

In one end of the frame A, is arranged a box I, that can rise and fall in its supports, but at the same time retain its same vertical plane. Through this box I, passes a screw shaft J, the end of which screw shaft is secured to the carriage C, by a pin $b$, passing through the carriage, and into a groove $c$, cut in or near the end of said screw shaft. This admits of the turning of the screw shaft and its forcing or drawing the carriage with it. A crank K, may be placed on the end of the screw shaft J, for operating it, or a pulley and band may be used. Over the screw shaft J, is placed another shaft L, which has a pinion M upon it, that is driven by a gear wheel N, on the screw shaft J. The shaft L, also passes through the sliding box I, and has one of its supports therein. Its other support is in a pillow block O, which is secured to the carriage C, there being a collar P, on said shaft on each side of the pillow block support O. The extreme end of the shaft L, has upon it a bevel pinion Q, which takes into a bevel gear R, arranged on the stem S, of the face plate. This arrangement of the driving gear, with the carriage and face plate, admits of the whole rising and falling upon the frame, while the parts continue to be in gear with each other.

Underneath the ways B, on which the carriage C, traverses, are two shafts T, U, which extend entirely across the machine, and are supported in the sides of the frame A. These shafts T, U, each carry a pair of cams $d$, $d$, upon which the ways B rest. They have also upon each of their ends cranks V, V, which are united by a connecting rod W. On one of these shafts T, is a curved slotted bar X, which I term a pattern, and which by a shank and nut $c$ is removable at pleasure, so that saws of any desired shape in their cross section can be ground upon the same machine by connecting with it a pattern corresponding to that shape.

An arm Y, projects from the end of the carriage C, horizontally, and to this arm is connected by an adjusting screw $f$, a vertical arm Z, and to the lower end of this arm Z, is a stud $g$, which has a friction roller $i$ upon it, which can roll snugly in the slot $h$, of the pattern. The adjustment that is made by the set screw $f$, is of the most delicate kind—the pattern being presumed to contain the form that is given to the saw plate. But at times the stone will wear faster or slower, or a harder or softer spot may be found in the saw plate, and then the adjustment by the set screw may be required the form in general being given by the pattern X. As the carriage advances, bringing the saw plate under the stone H, the roller $i$, presses down the pattern X, which in turn slowly rocks the shaft T, and as the shaft T, is connected to the shaft U, by their cranks V, V, and the connecting rods W (one only being seen) it imparts to the shaft U, an exactly corresponding motion. The motion of these two shafts T, U, brings around their cams $d$, $d$, and raise or let down the carriage, and face plate upon it, as they may be turning toward or from the swell of the cams. The stone revolves in bearings—fixed for the time being, and the rising or falling of the face plate gives the outline of the saw plate from its periphery to its hub. Thus a saw plate of the form shown in Fig. 3 may be ground, or it may be convex or concave on both sides, or convex upon one side and concave upon the other, or it may taper gradually or irregularly from the periphery to the eye just as the pattern is made, or, if it is only necessary to compensate for the wearing away of the stone which is about the $\frac{1}{32}$ of an inch in large plates, this can also be done by the pattern, which will gradually as the stone wears bring the face plate that much nearer to where its original diameter brought it. Otherwise the saw plate would be thicker at the eye than at the periphery. It is obvious that the stone may be made by a similar arrangement to approach and recede from the bed plate without changing the invention in the least.

To adapt the machine for grinding straight saw plates, it is only necessary to arrange the gear Q, so that it can be thrown out, and then face plate will traverse without rotating around its axis, and straight saws may be thus ground with varied thickness if desired or uniform.

Having thus fully described the nature of my invention, what I claim therein as new and desire to secure by Letter Patent is,

In combination with the face plate of a machine for grinding saws, a guide, pattern, or former, which can be used for giving shape to the saw plate, by causing the face plate or stone to approach or recede from each other to vary the bevel or thickness of the saw plate, or to compensate for the wearing away of the stone, while acting on said plate, or both, substantially as described.

ALBERT S. NIPPES.

Witnesses:
 A. B. STOUGHTON,
 E. COHEN.